US007883250B2

(12) United States Patent
Nishihata

(10) Patent No.: US 7,883,250 B2
(45) Date of Patent: Feb. 8, 2011

(54) LAMP UNIT FOR VEHICLES

(75) Inventor: Koji Nishihata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 199 days.

(21) Appl. No.: 12/109,074

(22) Filed: Apr. 24, 2008

(65) Prior Publication Data

US 2009/0268480 A1 Oct. 29, 2009

(51) Int. Cl.
*B60Q 1/00* (2006.01)

(52) U.S. Cl. ....................... 362/516; 362/539; 362/346; 362/538; 362/518

(58) Field of Classification Search ................. 362/516, 362/539, 517, 346, 351, 545, 538, 507, 518, 362/519, 298
See application file for complete search history.

(56) References Cited

U.S. PATENT DOCUMENTS 6,109,772 A 8/2000 Futami et al.
6,966,675 B2 11/2005 Albou
7,114,837 B2 10/2006 Yagi et al.
2007/0236951 A1 10/2007 Albou
2007/0268717 A1 11/2007 Iwasaki

FOREIGN PATENT DOCUMENTS

EP 1 843 085 A1 10/2007
EP 1 857 731 A2 11/2007
JP 2004-207235 A 7/2004
JP 2004-311224 A 11/2004
JP 2005-228715 A 8/2005
JP 2005-302328 A 10/2005
JP 2006-107955 A 4/2006
WO WO 2005/010430 A1 2/2005

OTHER PUBLICATIONS

U.S. Appl. No. 12/109,083, filed Apr. 24, 2008, Nishihata.
K. Nishihata, U.S. PTO Office Action dated Aug. 20, 2009, U.S. Appl. No. 12/109,083, 12 pages.
K. Nishihata, U.S. Final Office Action, U.S. Appl. No. 12/109,083, dated Mar. 8, 2010, 6 pages.
Koji Nishihata, U.S. PTO Notice of Allowance, U.S. Appl. No. 12/109,083, dated Jul. 19, 2010, 8 pages.

*Primary Examiner*—Sandra L O Shea
*Assistant Examiner*—Jessica L McMillan
(74) *Attorney, Agent, or Firm*—Foley & Lardner LLP

(57) ABSTRACT

In existing lamp unit for vehicles, the light from the semiconductor light source can not be effectively used. In the present invention, a planar reflect surface (7) is arranged between the projection lens (6) and its focus (FL1) in such a way that the planar reflect surface (7) intersects the light axis (Z1-Z1) of the projection lens (6); a light shutout member (8) is arranged between the semiconductor light source (4) and the projection lens (6); the light shutout member (8) is provided with supplemental reflect surfaces (17-20) reflecting the light (L3) from the semiconductor light source (4) toward the shade (5). As a result, the light (L3) from the semiconductor light source (4) can be effectively used.

8 Claims, 10 Drawing Sheets

LAMP UNIT FOR VEHICLES

FIELD OF THE INVENTION

The present invention relates to a projector type of lamp unit for vehicles using a semiconductor light source, for example LED and the like, as a light source, especially to a lamp unit for vehicles that can be used as a vertical projector lamp whose depth dimension and height dimension can be miniaturized, can prevent the light except the predetermined distributed light pattern projected from a projection lens, i.e. the light not distributed, from emitting from the projection lens, and can effectively use the light from the semiconductor light source.

BACKGROUND OF THE INVENTION

There exists the type of lamp unit for vehicles (for example, Patent 1, Patent 2, and Patent 3). The explanation of the existing lamp unit for vehicles is given now. The existing lamp unit for vehicles includes a reflector having an ellipse reflect surface, a semiconductor light source, for example LED and the like, arranged in such a way that its light emitting part is positioned at the first focus of the ellipse reflect surface, and a projection lens arranged on the reflector and projecting a predetermined distributed light pattern toward the predetermined direction.

The functions of the lamp unit for vehicles is now explained. The semiconductor light source, for example LED and the like, is lighted to emit light, and thus the light from the semiconductor light source, for example LED and the like, is reflected by the ellipse reflect surface, and, as a predetermined distributed light pattern, is projected (illuminates, emits, or is given off) outwardly in the predetermined direction from the projection lens.

However, because, in the existing lamp unit for vehicles, the light axis of the ellipse reflect surface and the light axis of the projection lens are horizontal, and the semiconductor light source, for example LED and the like, the reflector, and the projection lens are arranged in the horizontal direction, the depth dimension in the horizontal direction becomes big. Because of this reason, the existing lamp unit for vehicles can not meet the demands for reducing the depth dimension.

Furthermore, there exists the type of lamp unit for vehicles (for example, Patent 4) that uses a planar reflect surface and reduces the length between the front and the rear (i.e. reduce the depth dimension). However, this type of existing lamp unit for vehicles uses an electricity discharge lamp bulb instead of the semiconductor light source, for example LED and the like, as a light source. Moreover, in this type of lamp unit for vehicles, the light axis of the projection lens extends in the direction of the front and the rear (the horizontal direction) of the vehicle, making the light axis of the reflector intersect the light axis of the projection lens, and making the reflected light from the reflector reflected toward one side of the projection lens by the planar reflect surface. Therefore, because, in this type of lamp unit for vehicles, the electricity discharge lamp bulb, the reflector, and the projection lens, and the planar reflect surface are arranged in the direction of the front and the rear of the vehicle, the depth dimension in the horizontal direction becomes big, just as the lamp unit for vehicles mentioned in Patents 1-3, and it can not meet the demands for reducing the depth dimension.

Moreover, there exists the type of lamp unit for vehicles (for example, Patent 5) in which the light axis of the first reflector intersects the light axis of the second reflector and they become a compact module. However, this type of existing lamp unit for vehicles is not the projector type of lamp unit for vehicles that does not use projection lens. And moreover, because this type of existing lamp unit for vehicles is the one in which the light axis of the first reflector intersects the light axis of the second reflector, the height dimension in the vertical direction increases at the same time the depth dimension in the horizontal direction reduces, and thus it can not meet the demands for reducing the depth dimension and the height dimension.

Furthermore, the existing lamp unit for vehicles mentioned above do not take into consideration the method of preventing the light, except the predetermined distributed light pattern projected from the projection lens, from emitting from the projection lens, and therefore, there exists the circumstance where the light except the predetermined distributed light pattern projected from the projection lens, i.e. the light not distributed, emits from the projection lens. In addition, the existing lamp unit for vehicles mentioned above do not take into consideration the method of the effective use of the light from semiconductor light source, and therefore, the existing lamp unit for vehicles mentioned above do not effectively use the light from semiconductor light source.

Patent 1: Publication No. 2006-107955
Patent 2: Publication No. 2005-302328
Patent 3: Publication No. 2004-311224
Patent 4: Publication No. 2005-228715
Patent 5: Publication No. 2004-207235

SUMMARY OF THE INVENTION

The problems to be solved by the present invention are: in the existing lamp unit for vehicles, the demands for reducing the depth dimension in the horizontal direction and the height dimension in the vertical direction can not be met; there exists the circumstance where the light except the predetermined distributed light pattern projected from the projection lens, i.e. the light not distributed, emits from the projection lens; the light from semiconductor light source is not effectively used.

The present invention (Solution 1 of the present invention) is characterized in that a planar reflect surface is arranged between a projection lens and its focus in such a way that the planar reflect surface intersects the light axis of the projection lens; a light shutout member for shutting out the straight light from a semiconductor light source from illuminating toward the projection lens, is arranged between the semiconductor light source and the projection lens; supplemental reflect surface is arranged on the light shutout member for reflecting the light from the semiconductor light source toward the side of the shade.

Furthermore, the present invention (Solution 2 of the present invention) is characterized in that a shade for cutting off a portion of the reflected light emitting from the semiconductor light source and reflected by the first reflect surface, and for using the remaining reflected light to form a predetermined distributed light pattern having cutoff lines, is arranged between the second focus of the ellipse reflect surface, i.e. the first reflect surface, and the semiconductor light source; the shade is provided respectively with second reflect surface for reflecting the reflected light cut off by the shade toward the predetermined direction and second supplemental reflect surface for reflecting the reflected light from supplemental reflect surface, i.e. first supplemental reflect surface, toward the predetermined direction; the light shutout member is arranged in the range from one side of the projection lens to one side of the planar reflect surface to shut out the straight light from the semiconductor light source, the reflected light from the second reflect surface, and the reflected light from second supplemental reflect surface from illuminating toward the projection lens, and allow the reflected light from the first reflect surface, the reflected light from the second reflect surface, and the reflected light from the second supplemental reflect surface to illuminate toward the planar reflect surface, and allow the reflected light from the planar reflect surface to illuminate in the range of the projection lens.

Furthermore, the present invention (Solution 3 of the present invention) is characterized in that the first supplemental reflect surface and the second supplemental reflect surface each comprises at least one reflect surface.

Furthermore, the present invention (Solution 4 of the present invention) is characterized in that the second supplemental reflect surface is closer to one side of the shade than the line connecting the second focus of the first reflect surface to the zenith of the semiconductor light source.

Furthermore, the present invention (Solution 5 of the present invention) is characterized in that the planar reflect surface and the shade are formed integratedly, and the reflector and the light shutout member are formed integratedly.

The lamp unit for vehicles according to the present invention (Solution 1 of the present invention) is the one in which the planar reflect surface is arranged between the projection lens and its focus in such a way that the planar reflect surface intersects the light axis of the projection lens, as a result of which, at the symmetrical position with respect to the planar reflect surface by way of the planar reflect surface, the lens focus of the projection lens exists as a fictitious lens focus positioned at the second focus of the ellipse reflect surface, and the horizontal lens light axis of the projection lens exists as the fictitious light axis of the lens that is vertical and intersects the light axis of the lens orthogonally by way of the planar reflect surface, the fictitious light axis of the lens being consistent with the light axis of the ellipse reflect surface. Therefore, in the lamp unit for vehicles according to the present invention (Solution 1 of the present invention), the projection lens and the planar reflect surface can be arranged in the horizontal direction, and the projection lens, the planar reflect surface, the reflector, the semiconductor light source, and the shade are arranged in the vertical direction, and thus the lamp unit for vehicles according to the present invention (Solution 1 of the present invention) can reduce the depth dimension in the horizontal direction and the height dimension in the vertical direction, and can meet the demands for reducing the depth dimension and the height dimension.

Furthermore, in the lamp unit for vehicles according to the present invention (Solution 1 of the present invention), the light shutout member for shutting out the straight light from the semiconductor light source from illuminating toward the projection lens, is arranged between the semiconductor light source and the projection lens, and therefore, the light except the predetermined distributed light pattern projected from the projection lens, i.e. the light not distributed, can be prevented from emitting from the projection lens, which is advantageous to the transportation safety. In addition, the lamp unit for vehicles according to the present invention (Solution 1 of the present invention) can shut out the outer light illuminating from the projection lens toward the side of the ellipse reflection surface at the side of the semiconductor light source by the light shutout member arranged between the semiconductor light source and the projection lens, as result of which, the lamp unit for vehicles according to the present invention (Solution 1 of the present invention) can prevent the dubitable lighted light resulting from the circumstance where the outer light is reflected by the ellipse reflect surface and thus emits outwardly from the projection lens, leading to the semiconductor light source seeming to be lighted even though it is not lighted.

Moreover, because, in the lamp unit for vehicles according to the present invention (Solution 1 of the present invention), the light shutout member is provided with the supplemental reflect surface for reflecting the light from the semiconductor light source toward the predetermined direction, the light from the semiconductor light source can be effectively used by way of the supplemental reflect surface.

Furthermore, the lamp unit for vehicles according to the present invention (Solution 2 of the present invention) can cut off a portion of the reflected light emitting from the semiconductor light source and reflected by the first reflect surface, and can use the remaining reflected light to form a predetermined distributed light pattern having cutoff lines, by way of the shade arranged between the second focus of the ellipse reflect surface, i.e. the first reflect surface, and the semiconductor light source.

Furthermore, the lamp unit for vehicles according to the present invention (Solution 2 of the present invention) can reflect the reflected light cut off by the shade toward the predetermined direction by way of the second reflect surface arranged on the shade. Furthermore, the lamp unit for vehicles according to the present invention (Solution 2 of the present invention) can reflect the reflected light from the supplemental reflect surface, i.e. the first supplemental reflect surface, toward the predetermined direction by way of the second supplemental reflect surface arranged on the shade. Therefore, the lamp unit for vehicles according to the present invention (Solution 2 of the present invention) can effectively use the light from the semiconductor light source.

Furthermore, the lamp unit for vehicles according to the present invention (Solution 2 of the present invention) can shut out the straight light from the semiconductor light source, the reflected light from the second reflect surface, and the reflected light from second supplemental reflect surface from illuminating toward the projection lens by way of the light shutout member arranged in the range from one side of the projection lens to one side of the planar reflect surface, and can allow the reflected light from the first reflect surface, the reflected light from the second reflect surface, and the reflected light from the second supplemental reflect surface to illuminate toward the planar reflect surface, and allow the reflected light from the planar reflect surface to illuminate toward the projection lens. Therefore, the lamp unit for vehicles according to the present invention (Solution 2 of the present invention) can provide the lamp unit for vehicles that can effectively use the portion of the light, which is shut out from illuminating toward the projection lens, in the straight light from the semiconductor light source, the reflected light from the second reflect surface, and the reflected light from second supplemental reflect surface, and therefore, can provide the lamp unit for vehicles with a good utilization efficiency. Furthermore, the lamp unit for vehicles according to the present invention (Solution 2 of the present invention) does not use the light shutout member to shut out the reflected light from the first reflect surface, the reflected light from the second reflect surface, or the reflected light from the second supplemental reflect surface from illuminating reliably toward the planar reflect surface, and does not use the light shutout member to shut out the reflected light from the planar reflect surface from illuminating reliably toward the projection lens, and therefore, the lamp unit for vehicles according to the present invention (Solution 2 of the present invention) can provide the lamp unit for vehicles that does not lose and can effectively use the light distributed.

Furthermore, the lamp unit for vehicles according to the present invention (Solution 3 of the present invention) can obtain the secondary distributed light with respect to the distributed light having cutoff line by way of the first supplemental reflect surface and the second supplemental reflect surface. Furthermore, because the lamp unit for vehicles according to the present invention (Solution 3 of the present invention) is provided with at least one reflect surface, the secondary distributed light can be designed to be a respected secondary distributed light, such as the converging type of the secondary distributed light that can converges the light, or the diverging type of the secondary distributed light that can diverges the light.

Furthermore, because, in the lamp unit for vehicles according to the present invention (Solution 4 of the present invention), the second supplemental reflect surface is closer to one side of the shade than the line connecting the second focus of the first reflect surface to the zenith of the semiconductor light source, the reflected light from the first reflect surface is not cut off by the second supplemental reflect surface arranged on the shade when going ahead long the shade toward the second focus of the first reflect surface. Thus, the lamp unit for vehicles according to the present invention (Solution 4 of the present invention) can provide the lamp unit for vehicles that does not lose and can effectively use the light from the semiconductor light source.

Furthermore, because, in the lamp unit for vehicles according to the present invention (Solution 5 of the present invention), the planar reflect surface and the shade are formed integratedly, and the reflector and the light shutout member are formed integratedly, the number of the members can be reduced, and the manufacturing cost can be reduced. Furthermore, because, in the lamp unit for vehicles according to the present invention (Solution 5 of the present invention), the planar reflect surface for forming the fictitious focus of the projection lens and the shade for forming the cutoff line of the predetermined distributed light pattern are formed integratedly, the precision of the predetermined distributed light pattern having the cutoff line can be improved. Furthermore, because, in the lamp unit for vehicles according to the present invention (Solution 5 of the present invention), the reflector of the first reflect surface and the light shutout member for enabling the reflected light from the first reflect surface to illuminate toward the planar reflect surface are formed integratedly, the reflected light from the first reflect surface can illuminate reliably toward the planar reflect surface, and the light distributed is not lost and can be used effectively

BRIEF DESCRIPTION OF THE DRAWINGS

FIG. 11 is a diagram illustrating the relationship of the height of the supplemental second reflect surface and the zenith of the semiconductor light source.

DETAILED DESCRIPTION OF THE PREFERRED EMBODIMENT

Figure 1:
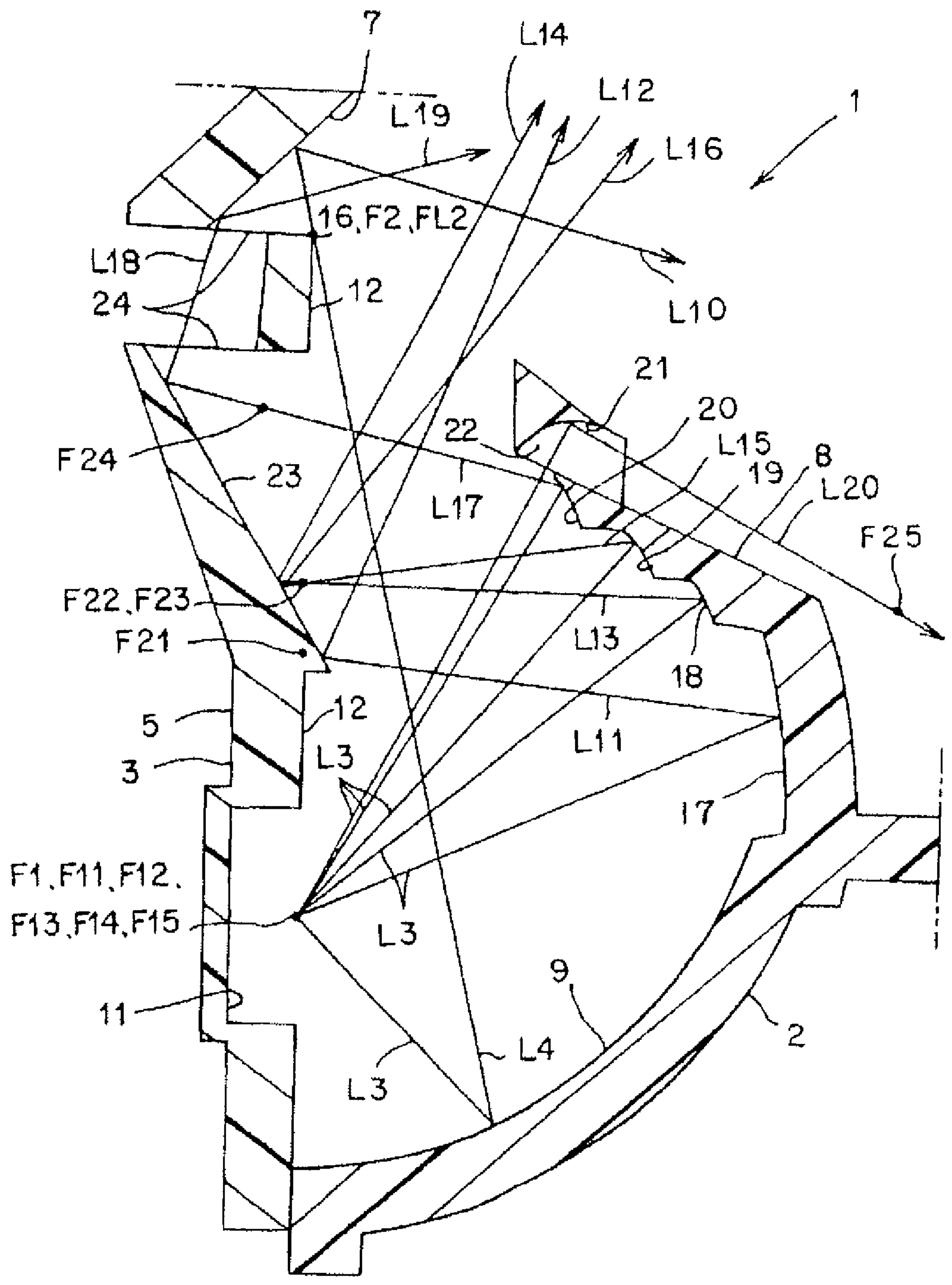
FIG. 1 is a diagram showing the light route of the light from the semiconductor light source in the first embodiment of the lamp unit for vehicles according to the present invention.

The detailed explanation of three examples of the lamp unit for vehicles of the embodiments according to the present invention is now given with reference to the drawings. In addition, the present invention is not limited to the embodiments. In the specification, the words “front, rear, up, down, left, right” mean the “front, rear, up, down, left, right” of the vehicle when the lamp unit for vehicles is mounted on the vehicle. In the drawings, the mark “VU-VD” means the up-down vertical line of the paper surface. The mark “HL-HR” means the left-right horizontal line of the paper surface. In addition, in the scope of the specification and the claims, “horizontal” means “horizontal or roughly horizontal”, and “vertical” means “vertical or roughly vertical”.

Embodiment 1

FIG. 1-FIG. 7 illustrate Embodiment 1 of the lamp unit for vehicles according to the present invention. The explanation of the structure of the lamp unit for vehicles of the Embodiment 1 is now given. In the figures, mark 1 is the lamp unit for vehicles in Embodiment 1 which is, for example, the head lamp of the vehicle. The lamp unit for vehicles mentioned here comprises a first reflector 2 (a main reflector, a light shutout member and concurrently a reflector) on the front side, a second reflector 3 (a subreflector, a shade and concurrently a reflector) on the rear side, a semiconductor light source 4, a shade 5, a projection lens 6 (a convex lens, spotlight lens), a planar reflect mirror 7, heat sink member (not shown), a light shutout member 8, a lamp housing and a lamp lens not shown (for example, a transparent outer lens, etc.).

The first reflector 2, the second reflector 3, the semiconductor light source 4, the shade 5, the projection lens 6, the planar reflect mirror 7, the heat sink member, and the light shutout member 8 constitute a lamp unit. As shown in the figures, the lamp unit is a stand-up type of projecting lamp constituting the lamp unit. In the lamp chamber divided by the lamp housing and lamp lens, of the head lamp of the vehicle, one or more of the lamp units are arranged, by, for example, the light axis adjusting device. In addition, there exist other cases where other lamp units besides the lamp units mentioned above are arranged in the lamp chamber and constitute the lamp unit for vehicles of the present invention.

Figure 2:
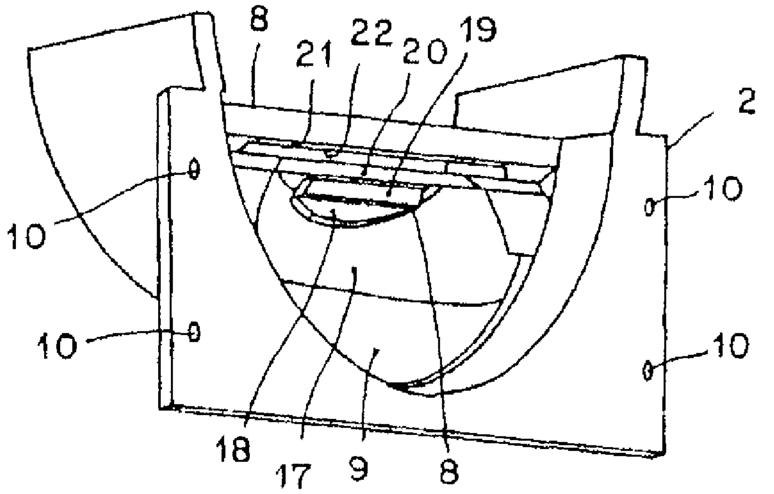
FIG. 2 is a three-dimensional diagram showing the first reflector of the components of the important parts.

The first reflector 2 and the second reflector 3 are formed of lightproof resin members, and are concurrently used as holding members such as a casing, a housing, and a holder. In addition, the first reflector 2 and the second reflector 3 are formed by being divided vertically along the vertical light axis Z2-Z2 of a later-on mentioned first reflect surface 9. The first reflector 2, the second reflector 3 and the heat sink member are fixed integratedly by the fixing members not shown (such as boltnut, screw, rivet, clip, etc.). In addition, the first reflector 2 and the second reflector 3 can be formed integratedly As shown in FIG. 2, the first reflector 2 has a semicircle opening at the lower part of its upper half, and has an opening at the rear part of its lower half, and furthermore, the front part of its lower half is sealed. The sealed part of the front part of the lower half of the first reflector 2 is formed with a protrusion in shape protruding outwardly (from the rear to the front). A first reflect surface 9 is arranged in the recess of the sealed part of the lower half of the first reflector 2 by way of aluminum steam plating or silver coating. A screw hole 10 for screw to fix the fixing member (or a through hole for screw to fix the fixing member) is arranged at each of the four corners of the first reflector 2.

The first reflect surface 9 is an ellipse reflect surface, i.e. an ellipse reflect surface or a reflect surface on the basis of ellipse. The ellipse reflect surface of the first reflect surface 9 is formed of reflect surface (the vertical section in FIG. 1, FIG. 5-8, is ellipse, and the horizontal section not shown is reflect surface such as paraboloid or deformed paraboloid) such as rotary ellipse surface or free NURBS on the basis of ellipse. Therefore, the first reflect surface 9 has a first focus F1 and a second focus or a focus line F2 of the horizontal section (i.e. the focus line whose two ends is at the up part and whose center is at the lower part, as viewed from the front). In addition, the second focus or the focus line F2 of the horizontal section is called shortly as “the second focus F2”. In addition, in the scope of the specification and the patent application, the second focus of the ellipse reflect surface and the second focus of the first reflect surface are referred to as “the second focus or the focus line F2 of the horizontal section”.

As shown in the figures, the second reflector 3 is formed of the vertical board with a semicircle opening at its upper part and a recess 11 at its lower part. In front of the vertical board of the second reflector 3, a second reflect surface 12 is provided along the plane or roughly a plane of the light axis Z2-Z2 of the first reflect surface 9 by way of aluminum steam plating or silver coating. The second reflect surface 12 is arranged between the second focus F2 of the first reflect surface 9 (i.e. the second focus F2 or its vicinity) and the semiconductor light source 4. A screw hole 13 for screw to fix the fixing member (or a through hole for screw to fix the fixing member) is arranged at each of the four corners of the vertical board of the second reflector 3.

The semiconductor light source 4 employs light-self-emitting semiconductor light source such as LED, EL (organic EL), etc. The semiconductor light source 4 comprises a base board 14, an illuminant (not shown) of the light source chip (semiconductor chip) in tiny rectangular shape (square shape) fixed on one surface of the base board 14, a light through member 15 covering the illuminant, and a connector or electric harness (not shown) connected to a power supply (not shown). The semiconductor light source 4 is fixed on the bottom of the recess 11 of the second reflector 3. In addition, an opening can be arranged on the recess 11 of the second reflector 3, and the semiconductor light source 4 can be fixed on the heat sink member. The illuminant (illuminant member) of the semiconductor light source 4 is positioned at the first focus F1 (i.e. the first focus or its vicinity) of the first reflect surface 9.

The shade 5 and the second reflector 3 are arranged integratedly, that is, the shade 5 is concurrently used as the vertical board of the second reflector 3, as a result of which, the second reflect surface 12 is arranged on the shade 5. Furthermore, the shade 5 and the second reflector 3 can be arranged separately and then integrated by a fixing member. The shade 5 is arranged between the second focus F2 (i.e. the second focus F2 or its vicinity) of the first reflect surface 9 and the semiconductor light source 4. In the part of the second focus F2 (i.e. the second focus F2 or its vicinity) of the first reflect surface 9 in the shade 5, a edge 16 is arranged along the second focus (the second focus line) F2 of the first reflect surface 9.

Figure 4:
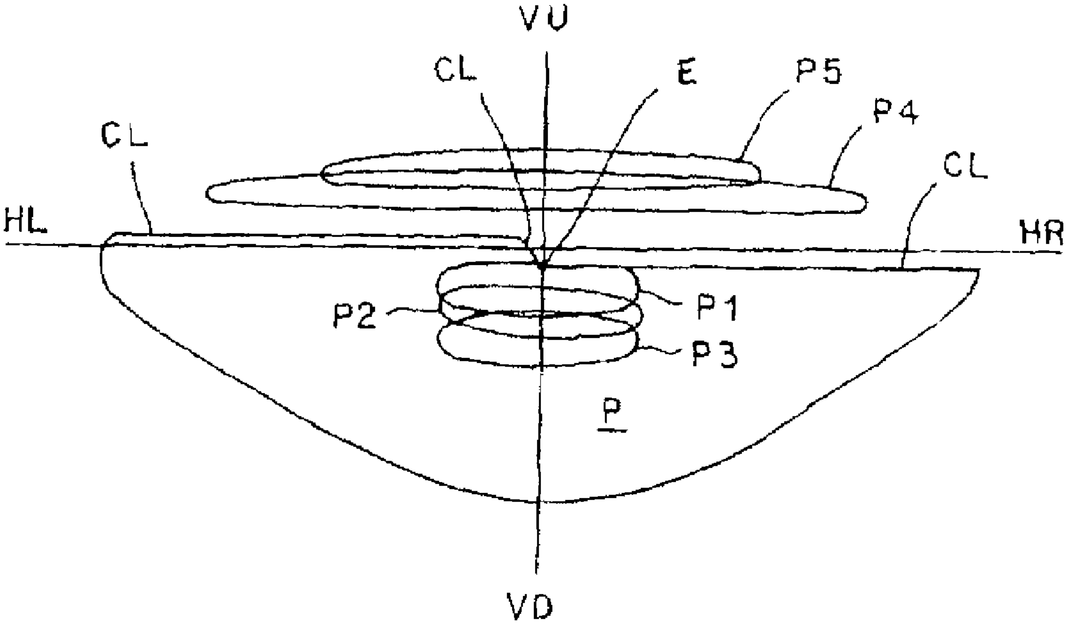
FIG. 4 is a diagram illustrating the distributed light pattern obtained in the first embodiment of the lamp unit for vehicles according to the present invention.

The shade 5 cuts off a portion of the reflected light 14 emitting from the semiconductor light source 4 and reflected by the first reflect surface 9 and uses the remaining reflected light to form a predetermined distributed light pattern P having cutoff lines CL, such as the distributed light pattern for interleaving, the distributed light pattern for high way, etc (see FIG. 4). The edge 16 of the shade 5 forms the cutoff lines CL of the distributed light pattern P and elbow E. Furthermore, the second reflect surface 12 reflects the reflected light L4 cut off by the shade 5 acting as a reflected light L9 toward the predetermined direction, i.e. one side of the planar reflect surface 7, and forms the secondary distributed light pattern (not shown).

The projection lens 6 is mounted at the edge formed at the semicircle opening of the semicircle at the lower half of the first reflector 2 and the edge formed at the semicircle opening of the semicircle at the upper half of the second reflector 3. Furthermore, the projection lens 6 can be mounted directly on the first reflector 2 and the second reflector 3, as shown in the embodiment, or is mounted by a ring and the like (not shown). The projection lens 6 is a non-spheric convex lens. The front side (outer side) of the projection lens 6 is formed as a non-spheric convex of a big curvature (a small curvature radius), while the other side, i.e. the rear side of the projection lens 6 (the side of the planar reflect surface 7) is formed as a non-spheric convex of a small curvature (a big curvature radius). Because the focal length of the projection lens 6 becomes smaller by way of this type of the projection lens 6, the dimension in the direction of the horizontal lens light axis Z1-Z1 of the projection lens 6, in Embodiment 1 of the lamp unit for vehicles according to the present invention, becomes compact. Furthermore, the rear side of the projection lens 6 can be a non-spheric plane (plane).

The projection lens 6 comprises lens focus FL1 away from the projection lens 6 by the front focal length FF and acting as the front focus (the focus at the side of the planar reflect surface 7), back focus (the focus at the outer side) away from the projection lens 6 by the back focal length, the horizontal lens light axis Z1-Z1 connecting the lens focus FL1 positioned at the front focus to the back focus. The vertical light axis of the Z2-Z2 of the first reflect surface 9 intersects the horizontal lens light axis Z1-Z1 of the projection lens 6 orthogonally. The lens focus FL1 of the projection lens 6 acts as meridional focus of the focal surface at the side of the space which the object lies in. Furthermore, because the light from the semiconductor light source 4 does possess much heat, the lens made of resin can be used as the projection lens 6. In the embodiment mentioned above, the projection lens 6 employs acryl. The projection lens 6 projects the predetermined distributed light pattern P having the cutoff lines CL reflected by the planar reflect surface 7 and the later-on mentioned secondary distributed light pattern P1, P2, P3, P4, P5 toward the front (see FIG. 4). Furthermore, the secondary distributed light pattern not shown illuminates from the planar reflect surface 7 through the projection lens 6 and is projected toward the front.

The planar reflect surface 7 is planar board shaped and arranged integratedly between the semicircle opening at the upper half of the second reflector 3 and the edge 16 of the shade 5. Furthermore, the second reflector 3, the shade 5, and the planar reflect surface 7 are arranged separately, and are fixed integratedly by a fixing member. On the surface of the planar reflect surface 7, aluminum steam plating or silver coating is employed. The planar reflect surface 7 is arranged in such a way that it intersects the lens light axis Z1-Z1 at 45 or roughly 45 between the projection lens 6 and the lens focus FL1 of the projection lens 6. The planar reflect surface 7 reflects the predetermined distributed light pattern P having the cutoff lines CL, the secondary distributed light pattern P1, P2, P3, P4, P5, and the secondary distributed light pattern not shown in the figures toward the side of the projection lens 6.

Figure 5:
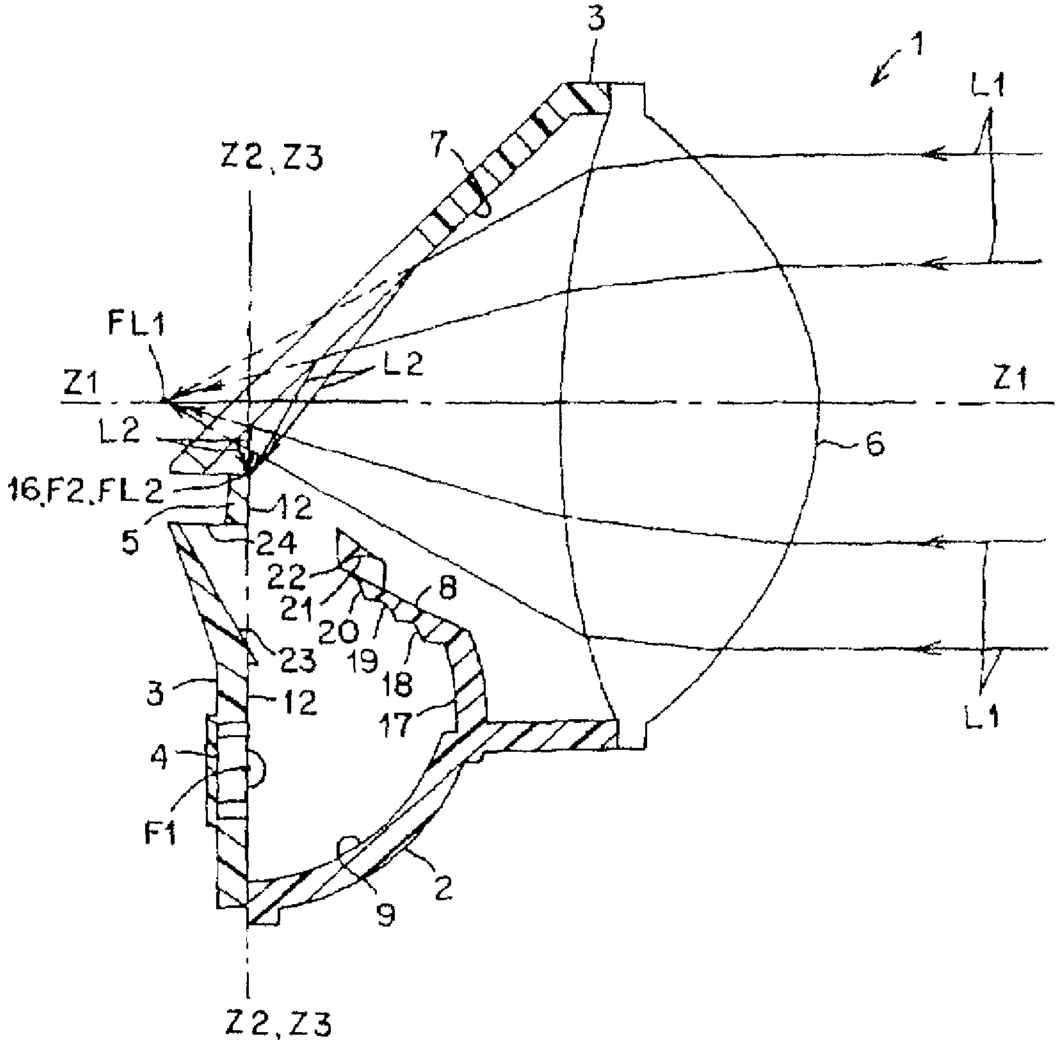
FIG. 5 is a diagram illustrating the principle of the reflect function of the planar reflect surface.
Figure 6:
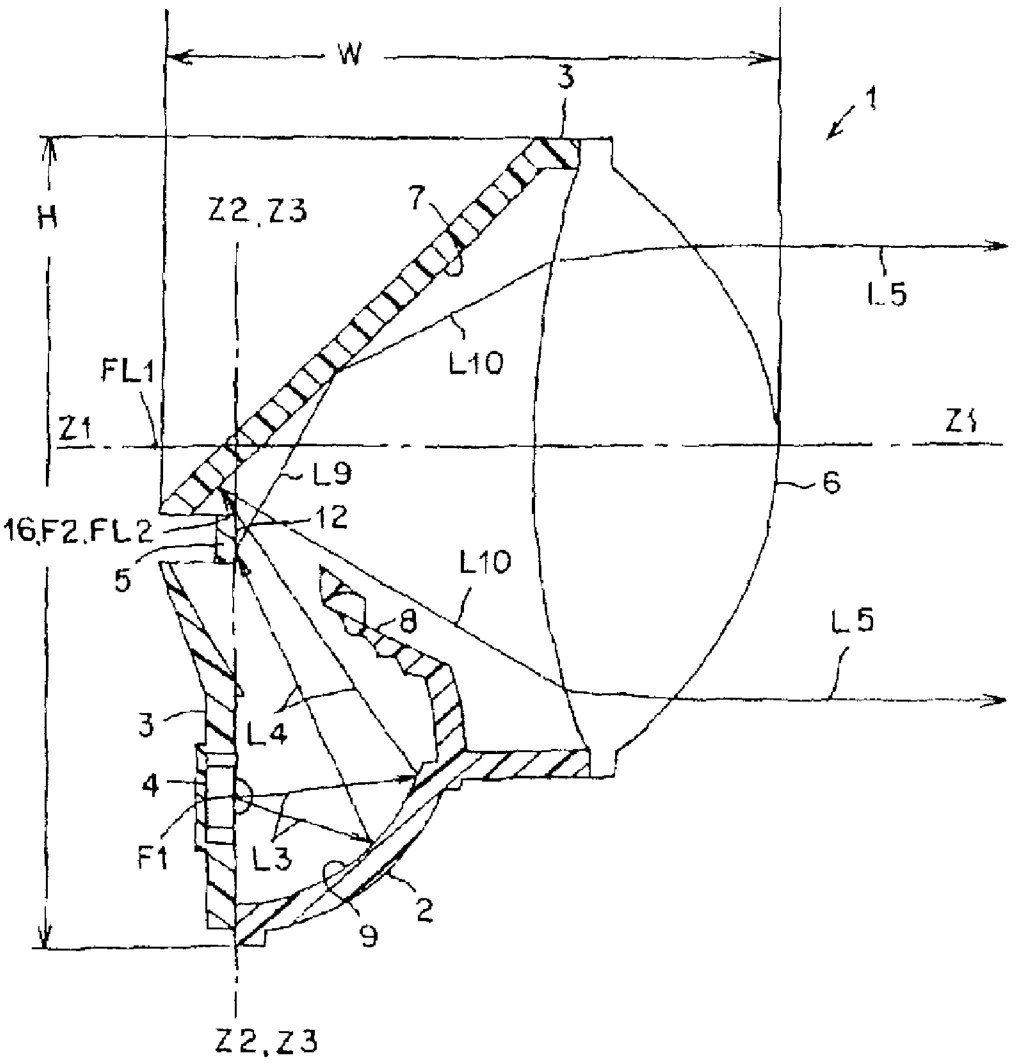
FIG. 6 is a diagram illustrating the principle of the reflect function of the first reflect surface and the second reflect surface.
Figure 7:
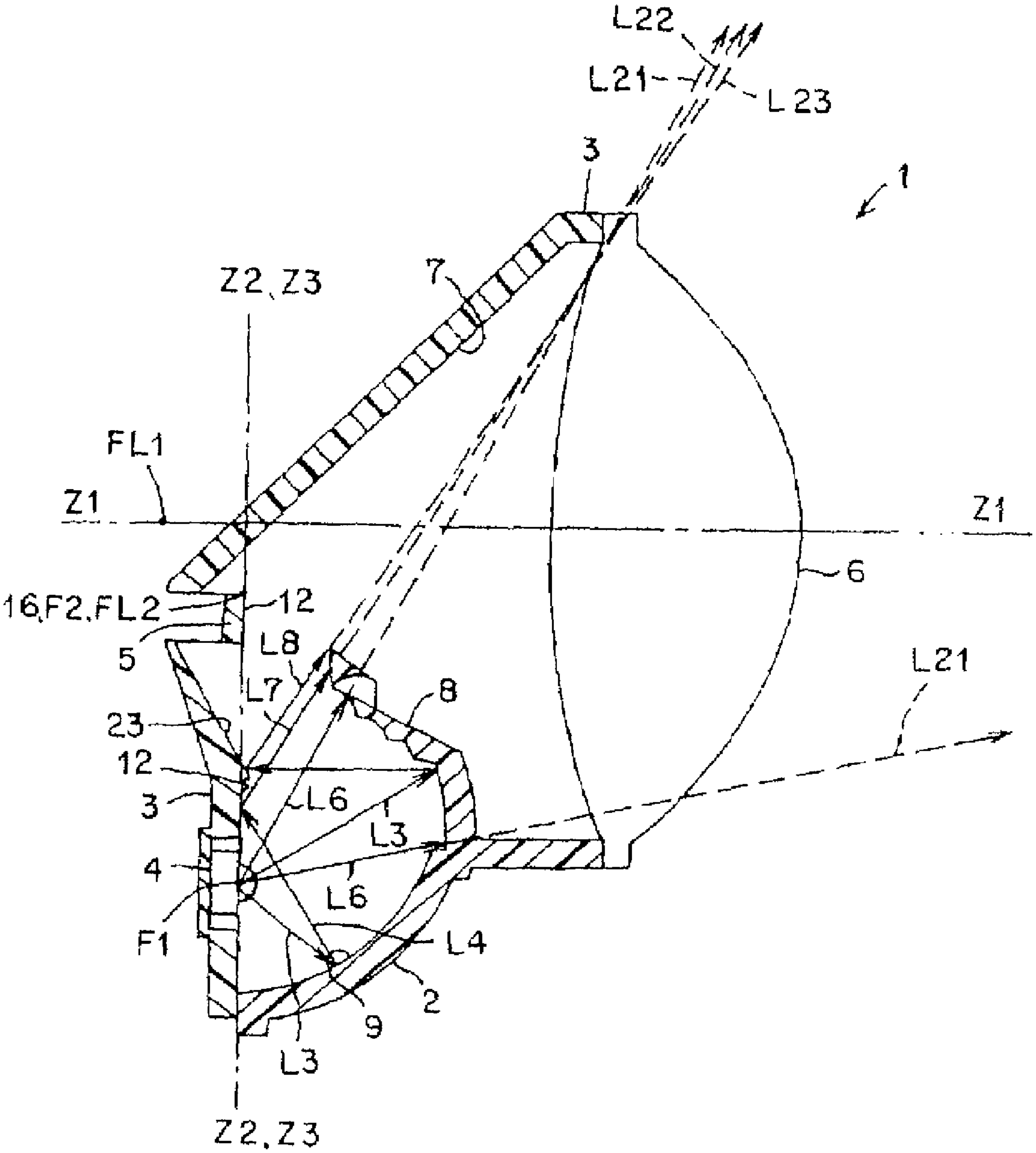
FIG. 7 is a diagram illustrating the principle of the light shutout function of the light shutout member

As shown in FIG. 5-FIG. 7, the lens focus FL1 of the projection lens 6 exists as a fictitious lens focus FL2 at the symmetrical position with respect to the planar reflect surface 7 by way of the planar reflect surface 7. The fictitious lens focus FL2 is positioned at the second focus F2 (i.e. the second focus F2 and its vicinity) of the first reflect surface 9. Furthermore, as shown in FIG. 5-FIG. 7, the horizontal lens light axis Z1-Z1 of the projection lens 6 exists as a vertical fictitious lens light axis Z3-Z3 intersecting the horizontal lens light axis Z1-Z1 orthogonally by way of the planar reflect surface 7. The vertical fictitious lens light axis Z3-Z3 is consistent or roughly consistent with the light axis Z2-Z2 of the first reflect surface 9.

As a result, as shown in FIG. 5, when the parallel lights L1 from outside illuminate the projection lens 6 from outside and go through the projection lens 6 and emit outwardly from the projection lens 6, the parallel lights L1 converge at the lens focus FL1 of the projection lens 6. The converged emitting lights from the projection lens 6 are reflected by the planar reflect surface 7, and the reflected lights L2 converge at the fictitious lens focus FL2, i.e. the second focus F2 of the first reflect surface 9. Furthermore, as shown in FIG. 5-FIG. 7, the horizontal lens light axis Z1-Z1 becomes the vertical fictitious lens light axis Z3-Z3, i.e. the light axis Z2-Z2 of the first reflect surface 9 by way of the planar reflect surface 7.

The heat sink member is provided with a plurality of fins arranged integratedly on the back surface (or the rear side or inside) of the planar board in the vertical direction and separated at an appropriate interval. The heat sink member is designed to be arranged vertically, i.e. stand-up. The front side (the face side or the surface) of the planar board of the heat sink member is mounted on the back surface (or the rear side or inside) of the board member of the second reflector 3. The heat sink member dissipates heat generated in the semiconductor light source 4 outwardly.

The light shutout member 8 is arranged integratedly on the first reflector 2, and is formed of a lightproof member. Furthermore, the light shutout member 8 and the first reflector 2 can be arranged separately and fixed integratedly by a fixing member. As shown in FIG. 1, FIG. 5-FIG. 7, the light shutout member 8 is arranged between the semiconductor light source 4 and the projection lens 6, that is, the light shutout member 8 is arranged at the place ranging from one side of the projection lens 6 to one side of the planar reflect surface 7, so that it can shut out the straight light L6 from the semiconductor light source 4, the reflected light L7 from the second reflect surface 12, and the later-on mentioned reflected light L8 from the second supplemental reflect surface 23 (25-27) from illuminating toward the projection lens 6, and enables the reflected light L4 from the first reflect surface 9, the reflected light L9 from the second reflect surface 12, and the reflected light L12, L14, L16 from the second supplemental reflect surface 23 (25-27) to illuminate toward the planar reflect surface 7, and enables the reflected light L10 from the planar reflect surface 7 to illuminate toward the projection lens 6 in the range of the projection lens 6. The one end of the light shutout member 8 is fixed at the edge of the semicircle opening of the first reflector 2 and the heel of the sealed part of the front part of the lower half of the first reflector 2, while the other end of the light shutout member 8 extends to the shade 5 and the second reflect surface 12, or extends to the second focus F2 of the first reflect surface 9, or extends to one side of the planar reflect surface 7. The light shutout member 8 can be of the planar board shape, or of the flexible board shape, or of other shape.

The light shutout member 8 is provided with the first supplemental reflect surface 17, 18, 19, 20, 21 reflecting the light L3 from the semiconductor light source 4 toward the predetermined direction. As shown in FIG. 1, the first supplemental reflect surface comprises the first part 17, the second part 18, the third part 19, the fourth part 20, and the fifth part 21. On the light shutout member 8, there is a though hole 22 arranged between the fourth part 20 and the fifth part 21.

The first part 17 of the first supplemental reflect surface is formed with the same ellipse reflect surface as the first reflect surface 9, and has a first focus F11 positioned at the first focus F1 and its vicinity of the first reflect surface 9 and a second focus F21 positioned above the first focus F11. Furthermore, the second part 18 of the first supplemental reflect surface is formed with the same ellipse reflect surface as the first reflect surface 9, and has a first focus F12 positioned at the first focus F1 and its vicinity of the first reflect surface 9 and a second focus F22 positioned above the second focus F21 of the first part 17. Furthermore, the third part 19 of the first supplemental reflect surface is formed with the same ellipse reflect surface as the first reflect surface 9, and has a first focus F13 positioned at the first focus F1 and its vicinity of the first reflect surface 9 and a second focus F23 positioned above the second focus F22 of the second part 18. Furthermore, the fourth part 20 of the first supplemental reflect surface is formed with the same ellipse reflect surface as the first reflect surface 9, and has a first focus F14 positioned at the first focus F1 and its vicinity of the first reflect surface 9 and a second focus F24 positioned above the second focus F22 of the second part 18 and the second focus F23 of the third part 19. Furthermore, the fifth part 21 of the first supplemental reflect surface is formed with the same ellipse reflect surface as the first reflect surface 9, and has a first focus F15 positioned at the first focus F1 and its vicinity of the first reflect surface 9 and a second focus F25 clamping the light shutout member 8 and positioned at the front and much above the first focus obliquely.

The shade 5 is provided with the second reflect surface 12 and the second supplemental reflect surface 23 (25-27) reflecting the reflected light L4 cut off by the shade 5 and acting as the reflected light L9 toward the predetermined direction. The second supplemental reflect surface 23 (25-27) are positioned in the middle of the reflect surface 12. The shade 5 is provided with the through hole 24 positioned between the planar reflect mirror 7 and the reflect surface 12 and between the reflect surface 12 and the second supplemental reflect surface 23 (25-27). From the bottom to the top, the second supplemental reflect surface 23 (25-27) tilt from the front to the rear.

Figure 3:
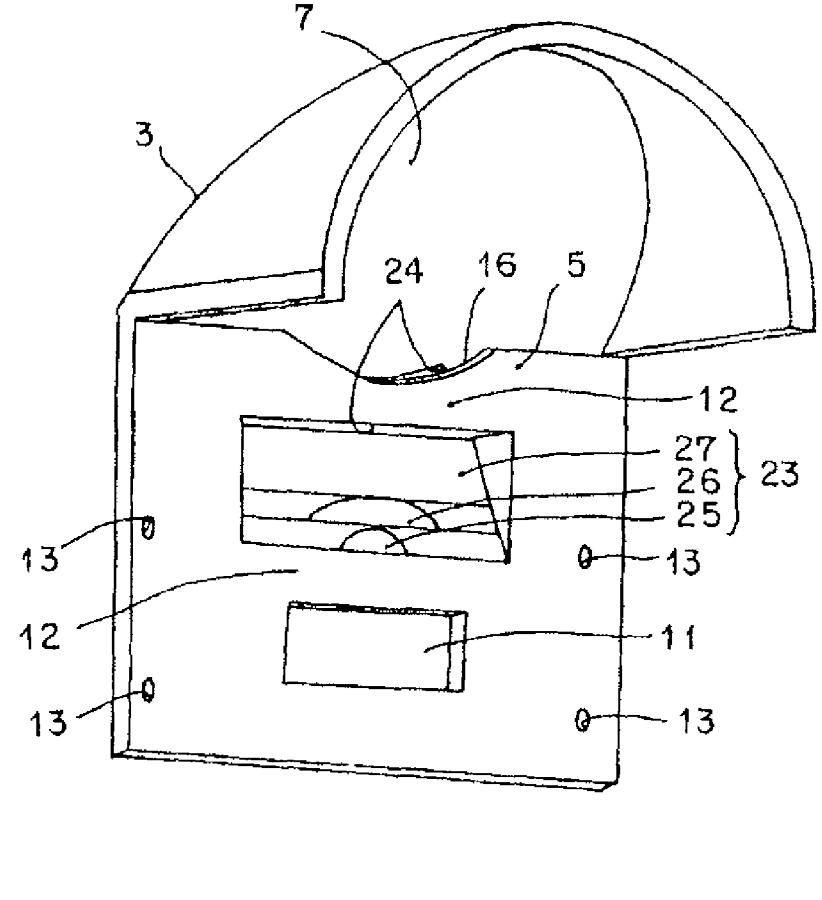
FIG. 3 is a three-dimensional diagram showing the second reflector of the components of the important parts.

As shown in FIG. 3, the second supplemental reflect surface comprises a first part 25, a second part 26, and a third part 27. The first part 25 of the second supplemental reflect surface 23 reflects the reflected light L11 reflected by the first part 17 of the first supplemental reflect surface and acting as reflected light L12 toward the predetermined direction, i.e. the one side of the planar reflect surface 7. Furthermore, the second part 26 of the second supplemental reflect surface 23 reflects the reflected light L13 reflected by the second part 18 of the first supplemental reflect surface and acting as reflected light L14 toward the predetermined direction, i.e. the one side of the planar reflect surface 7, and reflects the reflected light L15 reflected by the third part 19 of the first supplemental reflect surface and acting as reflected light L16 toward the predetermined direction, i.e. the one side of the planar reflect surface 7. Furthermore, the third part 27 of the second supplemental reflect surface 23 reflects the reflected light L17 reflected by the fourth part 20 of the first supplemental reflect surface and acting as reflected light L18 toward the predetermined direction, i.e. through the through hole 24 toward the one side of the planar reflect surface 7. The first part 25, the second part 26, and the third part 27 of the second supplemental reflect surface each comprises an ellipse reflect surface or other flexible reflect surface or planar reflect surface.

As a first predetermined secondary distributed light pattern P1, the reflected light L11 from the first part 17 of the first supplemental reflect surface and the reflected light L12 from the first part 25 of the second supplemental reflect surface 23 are reflected by the planar reflect surface 7 toward one side of the projection lens 6, and go through the projection lens 6 and are projected toward the front. Furthermore, as a second predetermined secondary distributed light pattern P2, the reflected light L13 from the second part 18 of the first supplemental reflect surface and the reflected light L14 from the second part 26 of the second supplemental reflect surface 23 are reflected by the planar reflect surface 7 toward one side of the projection lens 6, and go through the projection lens 6 and are projected toward the front. Furthermore, as a third predetermined secondary distributed light pattern P3, the reflected light L15 from the third part 19 of the first supplemental reflect surface and the reflected light L16 from the second part 26 of the second supplemental reflect surface 23 are reflected by the planar reflect surface 7 toward one side of the projection lens 6, and go through the projection lens 6 and are projected toward the front. Furthermore, as a fourth predetermined secondary distributed light pattern P4, the reflected light L17 from the fourth part 20 of the first supplemental reflect surface and the reflected light L18 from the third part 27 of the second supplemental reflect surface 23 are reflected by the planar reflect surface 7 toward one side of the projection lens 6, and go through the projection lens 6 and are projected toward the front.

As a reflected light L20, the light L13 from the semiconductor light source 4 is reflected through the through hole 22 by the fifth part 21 of the first supplemental reflect surface toward the predetermined direction, i.e. one side of the projection lens 6. As a fifth predetermined secondary distributed light pattern P5, the reflected light L20 from the fifth part 21 of the first supplemental reflect surface is reflected through the projection lens 6 toward the front.

The lamp unit for vehicles 1 in Embodiment 1 is structured as mentioned above. The explanation of their functions is now given as follows.

First of all, the illuminant of the semiconductor light source 4 of the lamp unit for vehicles 1 is lighted and thus emits light. Therefore, as shown in FIG. 6, the illuminant of the semiconductor light source 4 emits light L13, a portion of which is reflected by the first reflect surface 9 to form reflected light L4 that then converges at the second focus F2 of the first reflect surface 9 and the fictitious lens focus FL2. A portion of the L4 converging at the second focus F2 and the fictitious lens focus FL2 is cut off by the shade 5. The reflected L4 cut off by the shade 5 is reflected by the second reflect surface 12 integrated together with the shade 5, and as light L9, is reflected toward the predetermined direction, i.e. one side of the planar reflect surface 7. The reflected light L9 forms the predetermined secondary distributed light pattern (not shown). On the other hand, the remaining reflected light L4 is used to form the predetermined distributed light pattern P having cutoff line CL.

The reflected light L9 forming the predetermined secondary distributed light pattern and the reflected light L4 forming the predetermined distributed light pattern P having cutoff line CL are reflected by the planar reflect surface 7 to form light L10, which, as the light from the focus FL1 of the projection lens 6, is synthesized by the projection lens 6, and, as the predetermined distributed light pattern, the synthesized light (light L5 projected from the projection lens 6) is projected toward the front of the vehicle and illuminates the road and the like.

Furthermore, as shown in FIG. 1, a portion of the light L3 from the illuminant of the semiconductor light source 4 is reflected as reflected light L11 by the first part 17 of the first supplemental reflect surface, and then the reflected light L11 is reflected as reflected light L12 by the first part 25 of the second reflect surface 12 to form the first predetermined secondary distributed light pattern P1. The reflected light L12 forming the first predetermined secondary distributed light pattern P1 is reflected by the planar reflect surface 7 and projected by the projection lens 6 toward the front.

Also, as shown in FIG. 1, a portion of the light L3 from the illuminant of the semiconductor light source 4 is reflected as reflected light L13 by the second part 18 of the first supplemental reflect surface, and then the reflected light L13 is reflected as reflected light L14 by the second part 26 of the second reflect surface 12 to form the second predetermined secondary distributed light pattern P2. The reflected light L14 forming the second predetermined secondary distributed light pattern P2 is reflected by the planar reflect surface 7 and projected by the projection lens 6 toward the front.

Also, as shown in FIG. 1, a portion of the light L3 from the illuminant of the semiconductor light source 4 is reflected as reflected light L15 by the third part 19 of the first supplemental reflect surface, and then the reflected light L15 is reflected as reflected light L16 by the second part 26 of the second reflect surface 12 to form the third predetermined secondary distributed light pattern P3. The reflected light L16 forming the third predetermined secondary distributed light pattern P3 is reflected by the planar reflect surface 7 and projected by the projection lens 6 toward the front.

Also, as shown in FIG. 1, a portion of the light L3 from the illuminant of the semiconductor light source 4 is reflected as reflected light L17 by the fourth part 20 of the first supplemental reflect surface, and then the reflected light L17 is reflected as reflected light L18 by the third part 27 of the second reflect surface 12 to form the fourth predetermined secondary distributed light pattern P4. The reflected light L18 forming the fourth predetermined secondary distributed light pattern P4 is reflected by the planar reflect surface 7 and is projected by the projection lens 6 toward the front.

Also, as shown in FIG. 1, a portion of the light L3 from the illuminant of the semiconductor light source 4 goes through the through hole 22 of the light shutout member 8 and reflected as reflected light L20 by the fifth part 21 of the first supplemental reflect surface to form the fifth predetermined secondary distributed light pattern P5. The reflected light L20 forming the fifth predetermined secondary distributed light pattern P5 is projected by the projection lens 6 toward the front.

Therefore, as shown in FIG. 4, the predetermined distributed light pattern P having cutoff line CL, the first predetermined secondary distributed light pattern P1, the second predetermined secondary distributed light pattern P2, the third predetermined secondary distributed light pattern P3, the fourth predetermined secondary distributed light pattern P4, the fifth predetermined secondary distributed light pattern P5, and the predetermined distributed light pattern not shown are projected by the projection lens 6 toward the front of the vehicle and illuminate the road and the like. As shown in FIG. 4, the first predetermined secondary distributed light pattern P1, the second predetermined secondary distributed light pattern P2, and the third predetermined secondary distributed light pattern P3 form the distributed light pattern of high brightness with the cutoff line CL thereabove in the center of the predetermined distributed light pattern P. Furthermore, as shown in FIG. 4, the fourth secondary distributed light pattern P4 and the fifth secondary distributed light pattern P5 form the distributed light pattern for overhead sign with the cutoff line CL therebelow.

On the other hand, as shown in FIG. 7, the straight light L6 of the light L3 from the illuminant of the semiconductor light source 4 directly illuminating toward the projection lens 6 is shut off by the light shutout member 8 and thus cannot directly illuminates toward the projection lens 6. Here, if there is no light shutout member 8 and thus the straight light L21 (the reflected light marked in dot line) from the illuminant of the semiconductor light source 4, i.e. the straight light L21 not distributed, illuminates toward the projection lens 6, there exists the circumstance where the straight light L21 is left out in the oblique front above direction with respect to the projection lens 6 and becomes glare light. However, the lamp unit for vehicles 1 in Embodiment 1 can prevent the glare light by the light shutout member 8. Furthermore, in FIG. 7, although the straight light L21 left out of the projection lens 6 is marked by a straight line, in fact, it bends when illuminating toward and through the projection lens 6. Furthermore, there is a portion of the light L3 from the illuminant of the semiconductor light source 4 not shut out by the light shutout member 8 and illuminating directly to the planar reflect surface 7 (not shown), which then is reflected by the planar reflect surface 7 toward the predetermined direction i.e. one side of the projection lens 6, and, as light distributed, is projected by the projection lens 6 toward the front.

Also, as shown in FIG. 7, the reflected light L7 of the light from the second reflect surface 12 directly illuminating toward the projection lens 6 is shut out by the light shutout member 8 and thus cannot directly illuminates toward the projection lens 6. Here, if there is no light shutout member 8 and thus the reflected light L22 (the reflected light marked in dot line) from the second reflect surface 12, i.e. the reflected light L22 not distributed, illuminates toward the projection lens 6, there exists the circumstance where the reflected light L22 is left out in the oblique front above direction with respect to the projection lens 6 and becomes glare light. However, the lamp unit for vehicles 1 in Embodiment 1 can prevent the glare light by the light shutout member 8. Furthermore, in FIG. 7, although the reflected light L22 left out of the projection lens 6 is marked by a straight line, in fact, it bends when illuminating toward and through the projection lens 6.

Also, as shown in FIG. 7, the reflected light L8 of the light from the second supplemental reflect surface 23 directly illuminating toward the projection lens 6 is shut out by the light shutout member 8 and thus cannot directly illuminates toward the projection lens 6. Here, if there is no light shutout member 8 and thus the reflected light L23 (the reflected light marked in dot line) from the second supplemental reflect surface 23, i.e. the reflected light L23 not distributed, illuminates toward the projection lens 6, there exists the circumstance where the reflected light L23 is left out in the oblique front above direction with respect to the projection lens 6 and becomes glare light. However, the lamp unit for vehicles 1 in the embodiment can prevent the glare light by the light shutout member 8. Furthermore, in FIG. 7, although the reflected light L23 left out of the projection lens 6 is marked by a straight line, in fact, it bends when illuminating toward and through the projection lens 6.

Here, when the semiconductor light source 4 generates heat because of the illuminant of the semiconductor light source 4 being lighted, the heat is transmitted to the heat sink member, by which the heat is dissipated outwardly. Furthermore, the outer light, when illuminating from the projection lens 6 toward the first reflect surface 9, the second reflect surface 12, the first supplemental reflect surface 17-21, and the second supplemental reflect surface 23, which are at one side of the semiconductor light source 4, is shut out by the light shutout member 8, and therefore, the dubitable lighted light resulting from the circumstance where the semiconductor light source 4 seems to be lighted even though it is not lighted is prevented.

The lamp unit for vehicles 1 in Embodiment 1 is structured as mentioned above. The explanation of their functions is now given as follows.

Because the light shutout member 8 of the lamp unit for vehicles 1 in Embodiment 1 is provided with the first supplemental reflect surface 17-21 of the supplemental reflect surface reflecting the light L3 from the semiconductor light source 4 toward the predetermined direction, the light L3 from the semiconductor light source 4 can be effectively used by way of the first supplemental reflect surface 17-21, that is, the lamp unit for vehicles 1 in Embodiment 1 can effectively use the light L3 from the semiconductor light source 4 acting as the secondary distributed light pattern P1-P5 with respect to the predetermined distributed light pattern P by way of the first supplemental reflect surface 17-21. Specifically, the lamp unit for vehicles 1 in the embodiment can reflects the reflected light L11, L13, L15, and L17 from the first part 17, the second part 18, the third part 19, and the fourth part 20 of the first supplemental reflect surface acting as the reflected light L12, L14, L16, and L18 toward the predetermined direction. Therefore, the lamp unit for vehicles 1 in Embodiment 1 can effectively and reliably use the light L3 from the semiconductor light source 4.

Furthermore, because, in the lamp unit for vehicles 1 in Embodiment 1, the light shutout member 8 is arranged between the semiconductor light source 4 and the projection lens 6, the light shutout member 8 can shut out the straight light L6 from the semiconductor light source 4, the reflected light L7 from the second reflect surface 12, and the reflected light L8 from the second supplemental reflect surface 23 (25-27) from illuminating toward the projection lens 6. Therefore, the lamp unit for vehicles 1 in Embodiment 1 can prevent the light L21, L22, L23 except the predetermined distributed light pattern P illuminating from the projection lens 6, i.e. the L21, L22, L23 not distributed, from illuminating from the projection lens 6, and therefore, the lamp unit for vehicles 1 in Embodiment 1 is advantageous to safety of the transportation.

Furthermore, in the lamp unit for vehicles 1 in Embodiment 1, the planar reflect surface 7 is arranged between the projection lens 6 and its focus FL1 and intersects the lens light axis Z1-Z1 of the projection lens 6. As a result, in the lamp unit for vehicles 1 in Embodiment 1, the lens focus FL1 exists as a fictitious focus FL2 at the symmetric position with respect to the planar reflect surface 7 by way of the planar reflect surface 7; the fictitious focus FL2 is positioned at the second focus F2 of the first reflect surface 9 of the ellipse reflect surface; and the horizontal light axis Z1-Z1 of the projection lens 6 exists as a vertical fictitious light axis Z3-Z3 intersecting the horizontal light axis Z1-Z1 orthogonally by way of the planar reflect surface 7; the vertical fictitious light axis Z3-Z3 is consistent (consistent or roughly consistent) with the light axis Z2-Z2 of the first reflect surface 9 of the ellipse reflect surface. Thus, in the lamp unit for vehicles 1 in Embodiment 1, the projection lens 6, and the planar reflect surface 7 can be arranged in the horizontal direction, and the projection lens 6, the planar reflect surface 7, the first reflector 2, the second reflector 3, the semiconductor light source 4, and the shade 5 can be arranged in the vertical direction, and therefore, in the lamp unit for vehicles 1 in Embodiment 1, the depth dimension W in the horizontal direction and the height dimension H in the vertical direction can be reduced, and the demands for reducing the depth dimension W and the height dimension H can be met. Furthermore, the depth dimension W shown in FIG. 6 is the dimension from the front of the projection lens 6 to the rear of the second reflector 3. If the heat sink member is fixed on the back of the second reflector 3, the depth dimension becomes the dimension from the front of the projection lens 6 to the rear of the heat sink member.

Specifically, because, in the lamp unit for vehicles 1 in Embodiment 1, the light shutout member 8 shut out the straight light L6 illuminating from the semiconductor light source 4 toward the projection lens 6 and not distributed, the height dimension H can be further reduced. In other words, if there is no light shutout member 8, in order to prevent the straight light L6 not distributed from illuminating from the semiconductor light source 4 toward the projection lens 6, it is required sometimes to separate the semiconductor light source 4 and the projection lens 6 further apart in the vertical direction (i.e. increase the height dimension). By contrast, because the lamp unit for vehicles 1 in Embodiment 1 is provided with the light shutout member 8, the straight light L6 not distributed can be prevented from illuminating from the semiconductor light source 4 toward the projection lens 6 by way of the light shutout member 8, and the height dimension H can be reduced.

Furthermore, in the lamp unit for vehicles 1 in the embodiment, by way of the light shutout member 8 arranged between the semiconductor light source 4 and the projection lens 6, the outer light (not shown) can be shut out from illuminating from the projection lens 6 toward the first reflect surface 9, the second reflect surface 12, the first supplemental reflect surface 17-21, and the second supplemental reflect surface 23 (25-27), which are at the side of the semiconductor light source 4. As a result, the lamp unit for vehicles 1 in the embodiment can prevent the dubitable lighted light resulting from the circumstance where the outer light is reflected by the first reflect surface 9, the second reflect surface 12, the first supplemental reflect surface 17-21, and the second supplemental reflect surface 23 (25-27) and thus emits outwardly from the projection lens 6, leading to the semiconductor light source 4 seeming to be lighted even though it is not lighted.

Furthermore, because, in the lamp unit for vehicles 1 in Embodiment 1, the light shutout member 8 is arranged in the predetermined range from one side of the projection lens 6 to one side of the planar reflect surface 7, the straight light L6 from the semiconductor light source 4, the reflected light L7 from the second reflect surface 12, and the reflected light L8 from the second supplemental reflect surface 23 (25-27) can be shut out from illuminating toward the projection lens 6, and the reflected light L4 from the first surface 9, the reflected light L9 from the second reflect surface 12, and the reflected light L12, L14, L16 from the second supplemental reflect surface 23 (25-27) can illuminate toward the planar reflect surface 7, and the reflected light L10, L19 from the planar reflect surface 7 can illuminate toward the projection lens 6. Therefore, the lamp unit for vehicles 1 in Embodiment 1 can effectively use the portion of the straight light L6 from the semiconductor light source 4, the reflected light L7 from the second reflect surface 12, and the reflected light L8 from the second supplemental reflect surface 23 (25-27) that are shut out from illuminating toward the projection lens 6, and becomes a lamp unit for vehicles with high utilization efficiency. Furthermore, the lamp unit for vehicles 1 in Embodiment 1 does not use the light shutout member 8 to shut out the reflected light L4 from the first reflect surface 9, the reflected light L9 from the second reflect surface 12, and the reflected light L12, L14, L16 from the second supplemental reflect surface 23 (25-27) from illuminating toward the planar reflect surface 7 reliably, and does not use the light shutout member 8 to shut out the reflected light L0, L19 from the planar reflect surface 7 from illuminating toward the projection lens 6. Therefore, the lamp unit for vehicles 1 in Embodiment 1 does not lose 已经配光light and can reliably use the distributed light.

Furthermore, the lamp unit for vehicles 1 in Embodiment 1 is provided with the shade 5 arranged between the second focus F2 of the first reflect surface 9 of the ellipse reflect surface and the semiconductor light source 4 to cut off a portion of the reflected light L4 emitting from the semiconductor light source 4 and reflected by the first reflect surface 9, and use the remaining reflected light L4 to form the predetermined distributed light pattern P having the cutoff line CL. Furthermore, the lamp unit for vehicles 1 in Embodiment 1 can reflect the reflected light L4 cut off by the shade 5 as the reflected light L9 toward the planar reflect surface 7 by way of the second reflect surface 12 arranged on the shade 5, and thus the good light utilization efficiency can be obtained. Furthermore, the lamp unit for vehicles 1 in Embodiment 1 can reflect the light from the semiconductor light source 4, which is not shut out by the light shutout member 8 and illuminates toward the planar reflect surface 7 (not shown), toward the predetermined direction, i.e. one side of the projection lens 6, which then, as the distributed light, goes through the projection lens 6 and is projected toward the front. Therefore, the lamp unit for vehicles 1 in Embodiment 1 can effectively use the portion of the light from the semiconductor light source 4 that do not illuminate toward the first reflect surface 9 and the first supplemental reflect surfaces 17-21, and thus the good light utilization efficiency can be obtained.

Furthermore, because in the lamp unit for vehicles 1 in Embodiment 1, the first supplemental reflect surfaces 17-21 comprise five reflect surfaces and the second supplemental reflect surfaces 23 (25-27) comprise three reflect surfaces, it is possible to design the five distributed light pattern P1-P2 to be the expected secondary distributed light pattern, for example, the distributed light pattern with high brightness and the distributed light pattern for a overhead sign.

Furthermore, because, in the lamp unit for vehicles 1 in Embodiment 1, the planar reflect surface 7 and the shade 5 are structured integratedly, and the second reflector 2 and the light shutout member 8 are structured integratedly, the number of the components can be reduced, and the manufacturing cost can be reduced. Furthermore, because, in the lamp unit for vehicles 1 in Embodiment 1, the planar reflect surface 7 for forming the fictitious focus FL2 of the projection lens 6 and the shade 5 for forming the cutoff line CL of the predetermined distributed light pattern P are structured integratedly, the precision of the predetermined distributed light pattern P having the cutoff line CL can be improved. Furthermore, because, in the lamp unit for vehicles 1 in Embodiment 1, the first reflector 2 having the first reflect surface 9, and the light shutout member 8 enabling the reflected light L4 from the first reflect surface 9 to illuminate toward the planar reflect surface 7, are structured integratedly, the reflected light L4 from the first reflect surface 9 can illuminate reliably toward the planar reflect surface 7, and the distributed light is not be lost and can be reliably used.

Furthermore, in the lamp unit for vehicles 1 in Embodiment 1, the semiconductor light source 4 is mounted in the recess 11 of the second reflector 3 with the base board 14 of the semiconductor light source 4 mounted vertically, and the heat sink member is mounted vertically on the back surface of the second reflector 3. As a result, because, in the lamp unit for vehicles 1 in Embodiment 1, the semiconductor light source 4 and the heat sink member are arranged before and after each other in the horizontal direction, the heat generated in the semiconductor light source 4 can be dissipated efficiently by the vertically mounted heat sink member. Furthermore, because, in the lamp unit for vehicles 1 in Embodiment 1, the first reflector 2, the second reflector 3, the semiconductor light source 4, the shade 5, the projection lens 6, the planar reflect surface 7, and the heat sink member are arranged before and after each other in the horizontal direction, the space above the heat sink member is open to the outside, and thus, the lamp unit for vehicles 1 in Embodiment 1 can dissipate the heat efficiently toward the outside from the bottom to the top.

Furthermore, because, in the lamp unit for vehicles 1 in Embodiment 1, the light shutout member 8 is provided with the through hole 22 for the light L3 from the semiconductor light source 4 to go through, the light L3 from the semiconductor light source 4 can be effectively used by way of the through hole 22 of the light shutout member 8. Furthermore, the lamp unit for vehicles 1 in the embodiment can effectively use the light L3 from the semiconductor light source 4 as the secondary distributed light pattern P5 for a overhead sign by way of the fifth part 21 of the first supplemental reflect surface arranged on the surface that the through hole 22 is on. Furthermore, because, in the lamp unit for vehicles 1 in Embodiment 1, the fifth part 21 of the first supplemental reflect surface is formed with ellipse reflect surface, the distributed light pattern P5 for a overhead sign can be evenly distributed, and thus the distributed light pattern P5 with good vision identification can be obtained.

Furthermore, because, in the lamp unit for vehicles 1 in Embodiment 1, the light shutout member 8 is provided with the fourth part 20 of the first supplemental reflect surface for reflecting the light L3 from the semiconductor light source 4 toward the shade 5 and the shade 5 is provided with the through hole 24 for the light L17 from the fourth part 20 of the first supplemental reflect surface to go through and toward the planar reflect surface 7, the light L3 from the semiconductor light source 4 can be effectively used by way of the fourth part 20 of the first supplemental reflect surface of the light shutout member 8 and the through hole 24 of the shade 5. Furthermore, because, in the lamp unit for vehicles 1 in Embodiment 1, the shade 5 is provided with the third part 27 of the second supplemental reflect surface 23 for the reflected light L17 from the fourth part 20 of the first supplemental reflect surface to illuminate through the through hole 24 and to be reflected by the planar reflect surface 7, the light L13 from the semiconductor light source 4 as the distributed light pattern P4 for a overhead sign can be effectively used by way of the fourth part 20 of the first supplemental reflect surface and the third part 27 of the second supplemental reflect surface 23. Furthermore, because, in the lamp unit for vehicles 1 in Embodiment 1, the fourth part 20 of the first supplemental reflect surface is formed with an ellipse reflect surface, the distributed light pattern P4 for a overhead sign can be evenly distributed, and therefore, the distributed light pattern P4 for a overhead sign with high vision identification can be obtained.

Embodiment 2

Figure 8:
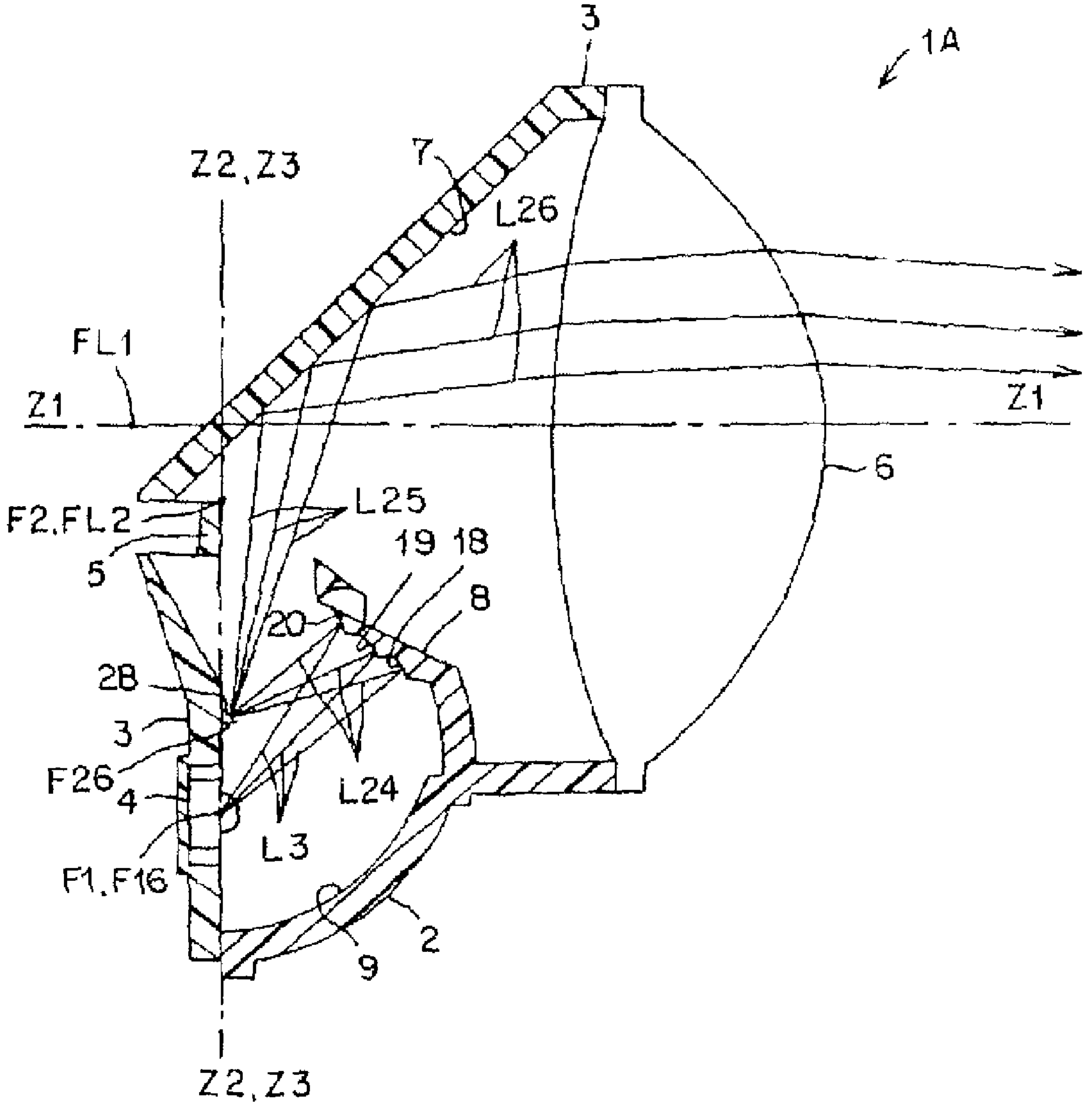
FIG. 8 is a diagram illustrating the principle of the reflect function of the first supplemental reflect surface and the supplemental second reflect surface in the second embodiment of the lamp unit for vehicles according to the present invention.
Figure 9:
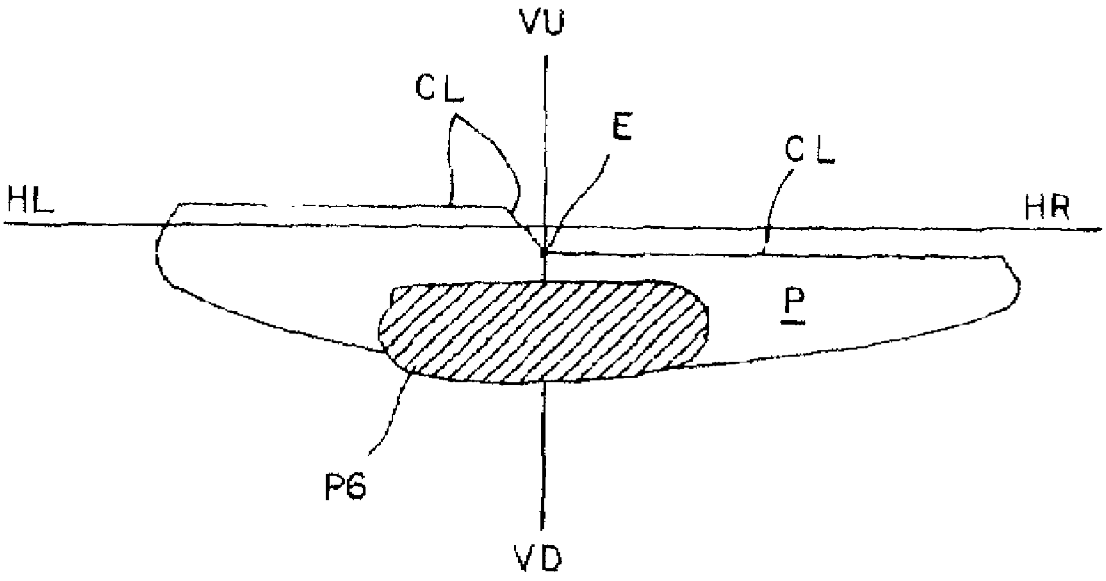
FIG. 9 is a diagram illustrating the distributed light pattern obtained in the second embodiment of the lamp unit for vehicles according to the present invention.

FIG. 8 and FIG. 9 illustrate the second embodiment of the lamp unit for vehicles according to the present invention. In the figures, the same marks as those in FIG. 1-FIG. 7 indicate the same components. The explanation of Embodiment 2 of the lamp unit for vehicles 1A according to the present invention is now given.

In the lamp unit for vehicles 1A in Embodiment 2, in the first supplemental reflect surface, the second focus of the second part 18, the second focus of the third part 19, and the second focus of the fourth part 20 are the focus 26 in common or roughly in common. On the other hand, in the second supplemental reflect surface, the reflect surface in common 28 is arranged at the focus 26 in common or its vicinity. The reflect surface in common 28 of the second supplemental reflect surface is formed with an ellipse reflect surface, or other flexible reflect surface, or a planar reflect surface.

Because the lamp unit for vehicles 1A in Embodiment 2 is structured as mentioned above, the light L3 from the semiconductor light source 4 is reflected by the second part 18, the third part 19 and the fourth part 20 of the first supplemental reflect surface, and propagates as a reflected light L24. The reflected light L24 is reflected at the focus 26 in common by the reflect surface in common 28 of the second supplemental reflect surface, and propagates toward the planar reflect surface 7 as a reflected light L25. The reflected light L25 is reflected by the planar reflect surface 7, and go through the projection lens 6 as a reflected light L26 and is projected as the sixth secondary distributed light pattern P6 toward the front. As shown in dot line in FIG. 9, the sixth secondary distributed light pattern P6 is a diffusion type of distributed light pattern positioned at the center of the predetermined distributed light pattern P and formed at the front.

Because the lamp unit for vehicles 1A in Embodiment 2 is structured as mentioned above, the same effect or roughly the same effect as the lamp unit for vehicles 1 in Embodiment 1 can be realized.

Embodiment 3

Figure 10:
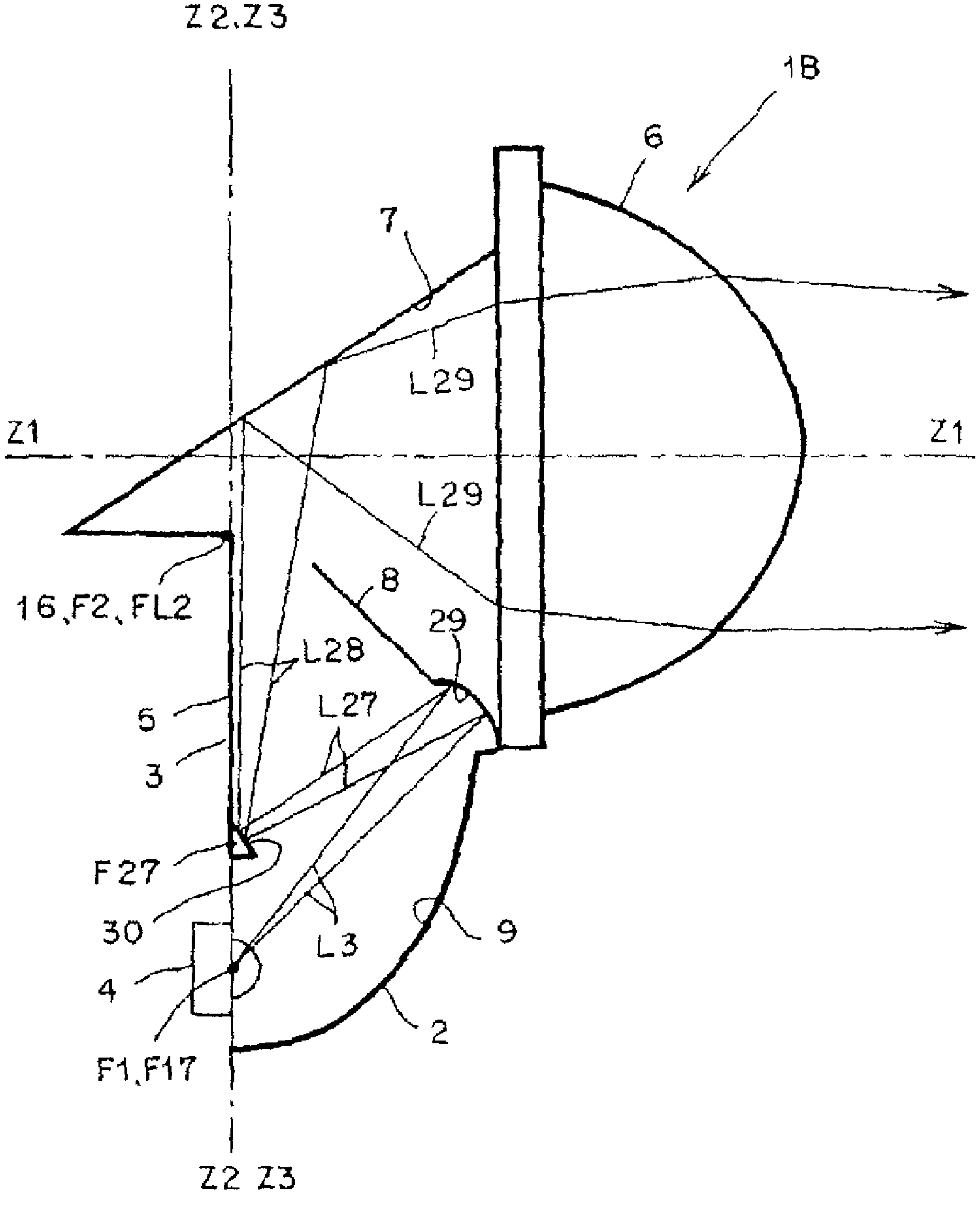
FIG. 10 is a diagram illustrating the principle of the reflect function of the first supplemental reflect surface and the supplemental second reflect surface in the third embodiment of the lamp unit for vehicles according to the present invention.
Figure 1:
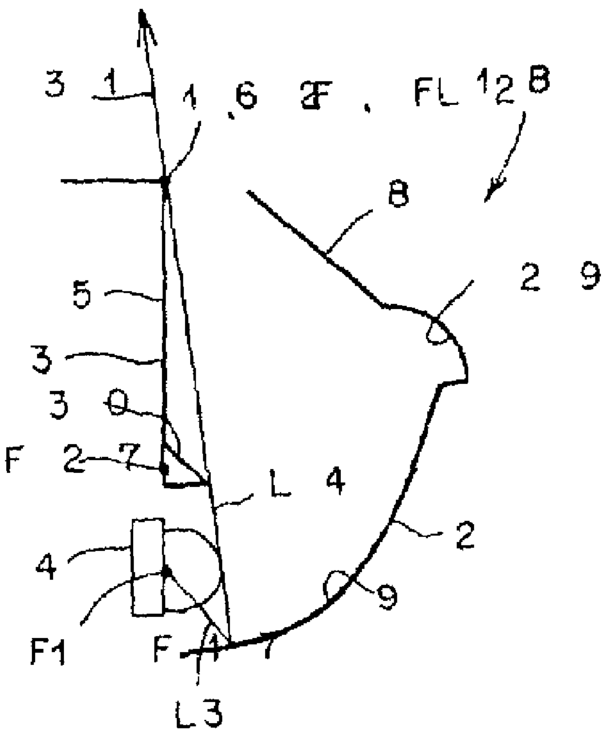
Figure 12:
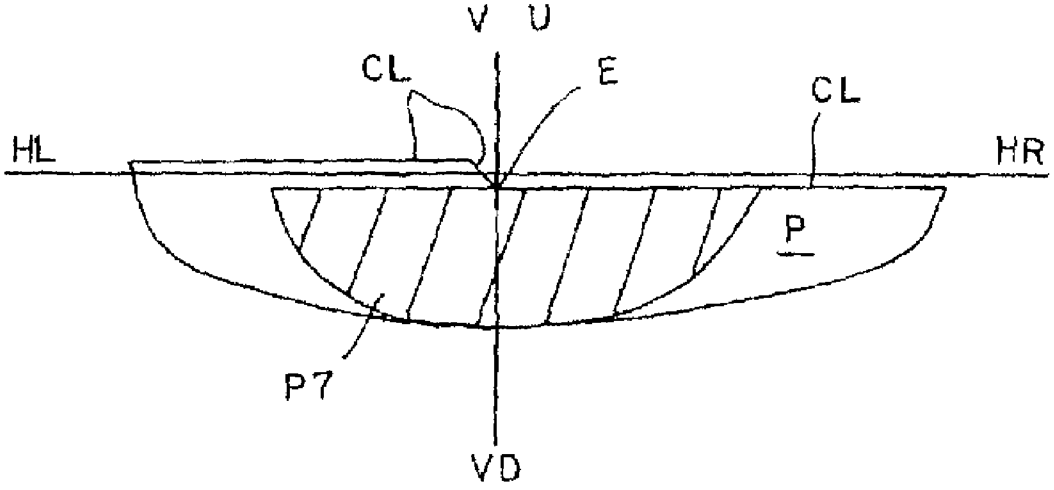
FIG. 12 is a diagram illustrating the distributed light pattern obtained in the third embodiment of the lamp unit for vehicles according to the present invention.

FIG. 10-FIG. 12 illustrate the third embodiment of the lamp unit for vehicles according to the present invention. In the figures, the same marks as those in FIG. 1-FIG. 9 indicate the same components. The explanation of Embodiment 3 of the lamp unit for vehicles 1B according to the present invention is now given.

In the lamp unit for vehicles 1B in Embodiment 3, the light shutout member 8 is provided with a first supplemental reflect surface 29 for reflecting the light L3 from the semiconductor light source 4 toward the predetermined direction. As shown in FIG. 1, the first supplemental reflect surface 29 is formed with an ellipse reflect surface, and has a first focus F17 positioned at the first focus F1 or it vicinity of the first reflect surface 9 and a second focus F27 positioned above the first focus F17. On the other hand, the shade 5 is provided a second supplemental reflect surface 30 positioned in the vicinity of the second focus F27. Furthermore, the second supplemental reflect surface 30 is positioned closer to the shade 5 than the line 31 connecting the second focus F2 of the first reflect surface 9 with the zenith of the semiconductor light source 4. The second supplemental reflect surface 30 is formed with an ellipse reflect surface, or other flexible reflect surface, or a planar reflect surface.

Because the lamp unit for vehicles 1B in Embodiment 3 is structured as mentioned above, the light L3 from the semiconductor light source 4 is reflected by the first supplemental reflect surface 29 and propagates as a reflected light L27 toward the second focus F27. The reflected light L27 at the second focus F27 is reflected by the second supplemental reflect surface 30, and propagates as a reflected light L28 toward the planar reflect surface 7. The reflected light L28 is reflected by the planar reflect surface 7, and go through the projection lens 6 as a reflected light L29 and is projected as the seventh secondary distributed light pattern P7 toward the front. As shown in dot line in FIG. 12, the seventh secondary distributed light pattern P7 is a diffusion type of distributed light pattern positioned at the center of the predetermined distributed light pattern P and formed at the front.

Because the lamp unit for vehicles 1B in Embodiment 3 is structured as mentioned above, the same effect or roughly the same effect as the lamp unit for vehicles 1 in Embodiment 1 can be realized.

Specifically, because, in the lamp unit for vehicles 1B in Embodiment 3, the second supplemental reflect surface 30 is positioned closer to the shade 5 than the line 31 connecting the second focus F2 of the first reflect surface 9 with the zenith of the semiconductor light source 4, the reflected light L4 from the first reflect surface 9, when propagating toward the second focus F2 of the first reflect surface 9 along the shade 5, is not shut out by the second supplemental reflect surface 30 arranged on the shade 5, as shown in FIG. 11, and therefore, the lamp unit for vehicles 1B in Embodiment 3 can provide the lamp unit for vehicles that does not lose and can effectively use the light from the semiconductor light source 4.

Furthermore, in Embodiments 1, 2, 3 mentioned above, as a lamp unit for vehicles, the head lamp for vehicles is explained in detail. However, in the present invention, as a lamp unit for vehicles, besides the head lamp, the lamp unit for vehicles can also be, for example, the tail lamp, the brake lamp, or the tail-brake lamp of the rear combination lamp, and the like.

Furthermore, in Embodiments 1, 2, 3 mentioned above, the explanation is made as to the example concerning the first reflect surface 9, the second reflect surface 12, the first supplemental reflect surface 17-21, 19, the second supplemental reflect surface 23 (25-27), 28, 30. However, the present invention also has the ellipse reflect surface (the first reflect surface 9) arranged on the reflector and the supplemental reflect surface arranged on the light shutout member. In other words, in the present invention, the second reflect surface 12 and the second supplemental reflect surface 23 (25-27), 28, 30 may not be needed. In this case, because the reflected light from the second reflect surface and the reflected light from second supplemental reflect surface do not occur, the light shutout member does not need to shut out the reflected light from the second reflect surface and the reflected light from second supplemental reflect surface.

Furthermore, in Embodiments 1, 2, 3 mentioned above, the predetermined distributed light pattern P and the secondary distributed light pattern P1-P7 having the cutoff line CL are illuminated. However, in the present invention, as a predetermined distributed light pattern, it can be distributed light pattern not having the cutoff line, such as the distributed light pattern for fog lamp, the distributed light pattern for the wet road, the distributed light pattern for detime lamp, the distributed light pattern for tail lamp, the distributed light pattern for brake lamp, the distributed light pattern for tail-brake lamp, the distributed light pattern for backup lamp, etc.

Furthermore, in Embodiments 1, 2, 3 mentioned above, the first reflector 2 and the second reflector 3 are formed separately and are fixed integratedly with the heat sink member by a fixing member. However, in the present invention, the first reflector 2 and the second reflector 3 can be formed integratedly.

Furthermore, in Embodiments 1, 2, 3 mentioned above, the projection lens 6 and the first reflector 2 and the second reflector 3 are formed separately and mounted. However, in the present invention, the projection lens 6 and the first reflector 2 and the second reflector 3 can be formed integratedly. In this case, the ring member and the mounting member are not needed.

Furthermore, in Embodiments 1, 2, 3 mentioned above, the light shutout member 8 shuts out the straight L6 from the semiconductor light source 4 illuminating directly toward the projection lens 6, the reflected light L7 from the reflect surface 12 illuminating directly toward the projection lens 6, and the reflected light L8 from the second supplemental reflect surface 23 (25-27), 28, 30 illuminating directly toward the projection lens 6. However, in the present invention, only the straight L6 from the semiconductor light source 4 illuminating directly toward the projection lens 6 may be shut out.

Furthermore, in Embodiments 1, 2, 3 mentioned above, the first supplemental reflect surfaces 17-21, 29 each is formed with the same the ellipse reflect surface as the first reflect surface 9. However, in the present invention, the first supplemental reflect surface can be formed with other flexible surface or planar surface.

What is claimed is:

1. A lamp unit for vehicles of projector type using a semiconductor light source as a light source, comprising:

a reflector having an ellipse reflect surface;

a semiconductor light source arranged in such a way that its light emitting part is positioned at a first focus of the ellipse reflect surface;

a projection lens with its lens light axis in a horizontal direction for projecting a predetermined distributed light pattern toward a predetermined direction;

a planar reflect surface arranged between the projection lens and its focus in such a way that the planar reflect surface intersects the light axis of the projection lens and reflects the predetermined distributed light pattern toward one side of the projection lens;

a light shutout member arranged between the semiconductor light source and the projection lens for shutting out all straight light from the semiconductor light source from illuminating toward the projection lens, the straight light directed straight from the semiconductor light source toward the projection lens;

the focus of the projection lens exists as a fictitious focus at a symmetrical position with respect to the planar reflect surface by way of the planar reflect surface, the fictitious focus is positioned at a second focus of the ellipse reflect surface, the lens light axis exists as a fictitious lens light axis intersecting the lens light axis orthogonally by way of the planar reflect surface, the fictitious lens light axis is consistent with the light axis of the ellipse reflect surface; and a supplemental reflect surface arranged on the light shutout member for reflecting the light from the semiconductor light source toward a side of a shade of the lamp unit.

2. A lamp unit for vehicles according to claim 1, wherein, the ellipse reflect surface is a first reflect surface;

the supplemental reflect surface is a first supplemental reflect surface;

wherein the shade is arranged between the second focus of the ellipse reflect surface and the semiconductor light source, for cutting off a portion of the reflected light emitting from the semiconductor light source and reflected by the ellipse reflect surface, and using the remaining reflected light to form a predetermined distributed light pattern having cutoff lines, the shade is provided respectively with a second reflect surface for reflecting the reflected light cut off by the shade toward the predetermined direction and a second supplemental reflect surface for reflecting the reflected light from the first supplemental reflect surface toward the predetermined direction;

the light shutout member is arranged at the place ranging from one side of the projection lens to one side of the planar reflect surface, so that it can shut out the straight light from the semiconductor light source, the reflected light from the second reflect surface, and the reflected light from the second supplemental reflect surface from illuminating toward the projection lens, and enables the reflected light from the first reflect surface, the reflected light from the second reflect surface, and the reflected light from the second supplemental reflect surface to illuminate toward the planar reflect surface, and enables the reflected light from the planar reflect surface to illuminate toward the projection lens in the range of the projection lens.

3. A lamp unit for vehicles according to claim 2, wherein, the first supplemental reflect surface and the second supplemental reflect surface comprise at least one reflect surface.

4. A lamp unit for vehicles according to claim 3, wherein, the reflect surface and the shade are formed integratedly;

the reflector and the light shutout member are formed integratedly.

5. A lamp unit for vehicles according to claim 3, wherein, the second reflect surface is positioned closer to the shade than the line connecting the second focus of the first reflect surface with the zenith of the semiconductor light source.

6. A lamp unit for vehicles according to claim 2, wherein, the second reflect surface is positioned closer to the shade than the line connecting the second focus of the first reflect surface with the zenith of the semiconductor light source.

7. A lamp unit for vehicles according to claim 6, wherein, the reflect surface and the shade are formed integratedly;

the reflector and the light shutout member are formed integratedly.

8. A lamp unit for vehicles according to claim 2, wherein, the reflect surface and the shade are formed integratedly;

the reflector and the light shutout member are formed integratedly.

* * * * *